United States Patent [19]
Peterson

[11] Patent Number: 5,365,416
[45] Date of Patent: Nov. 15, 1994

[54] SUN VISOR WITH INTEGRAL CORE

[75] Inventor: Don M. Peterson, Quincy, Mich.

[73] Assignee: Crotty Corporation, Quincy, Mich.

[21] Appl. No.: 868,945

[22] Filed: Apr. 15, 1992

[51] Int. Cl.$^5$ .................. B60Q 3/02; B60R 21/055; B60R 1/12; B60J 3/02
[52] U.S. Cl. ............................... 362/135; 362/83.1; 296/97.5; 296/97.8; 160/370.2 R; 160/DIG. 3
[58] Field of Search ............... 362/75, 83.1, 83.3, 362/135, 74, 142; 296/97.5, 97.1, 97.8; 160/370.2, DIG. 3, 370.2 R

[56] References Cited

U.S. PATENT DOCUMENTS

| | | | |
|---|---|---|---|
| 4,075,468 | 2/1978 | Marcus | 362/144 |
| 4,203,149 | 5/1980 | Viertel et al. | 362/144 |
| 4,353,592 | 10/1982 | Cziptschirsch | 296/97 B |
| 4,364,597 | 12/1982 | Viertel et al. | 296/97 |
| 4,378,129 | 3/1983 | Kaiser et al. | 296/97 |
| 4,411,467 | 10/1983 | Cziptschirsch | 296/97 H |
| 4,494,789 | 1/1985 | Flowerday | 296/97.1 |
| 4,635,994 | 1/1987 | Dietz et al. | 296/97 H |
| 4,952,008 | 8/1990 | Lobanoff et al. | 296/97.8 |
| 5,042,867 | 8/1991 | Crotty, III et al. | 296/97.8 |
| 5,054,839 | 10/1991 | White et al. | 296/97.1 |

Primary Examiner—Ira S. Lazarus
Assistant Examiner—L. Heyman
Attorney, Agent, or Firm—Baker & Daniels

[57] ABSTRACT

A vehicular sun visor having a single molded plastic core member. A first face of the core member includes an integrally molded channel member for receiving an extender blade therein. The opposite face of the core member includes a series of integrally molded channels and grooves for the reception of a series of wires and lamps comprising the lighting circuitry. An upholstery cover member is folded over the core member and secured along a seam. The cover member is adhered to a rigid foundation and includes a pair of access openings therein through which a mirror and lens assembly is removably attached to the core member. The cover member defines the shape of the sun visor.

13 Claims, 5 Drawing Sheets

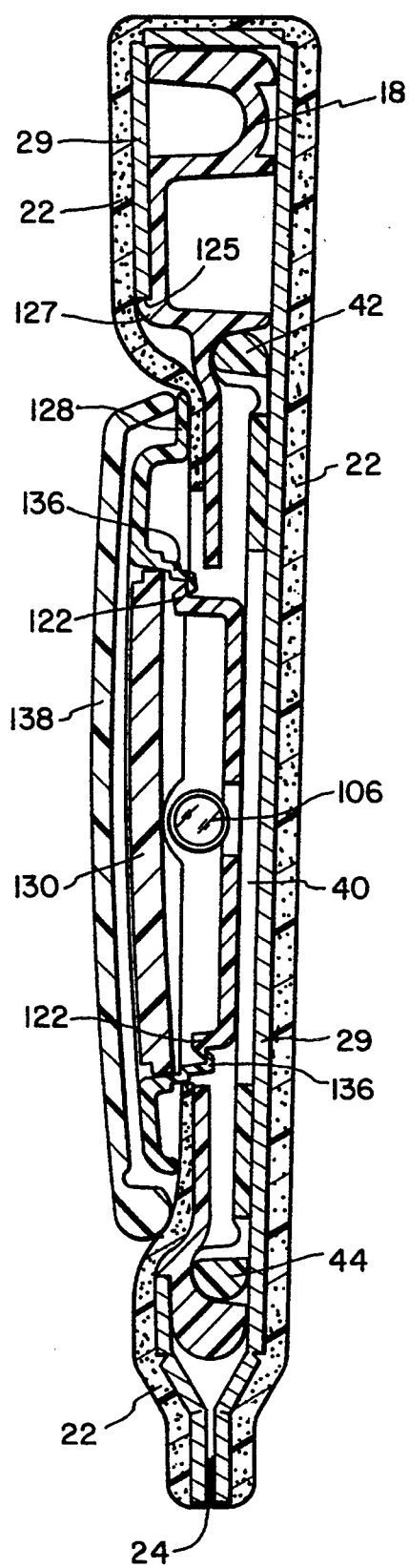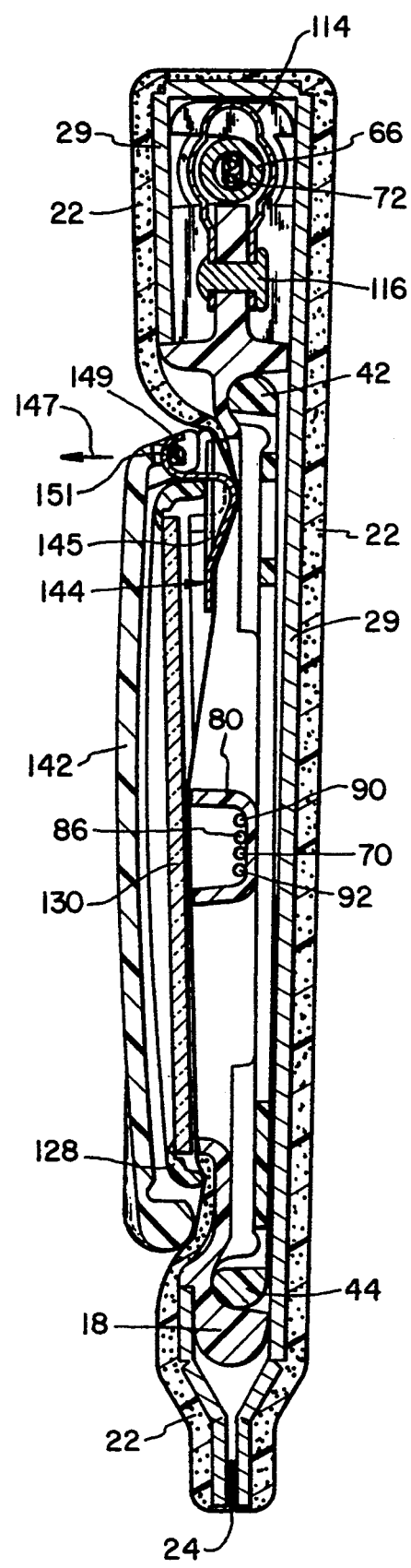
FIG. 3
FIG. 4

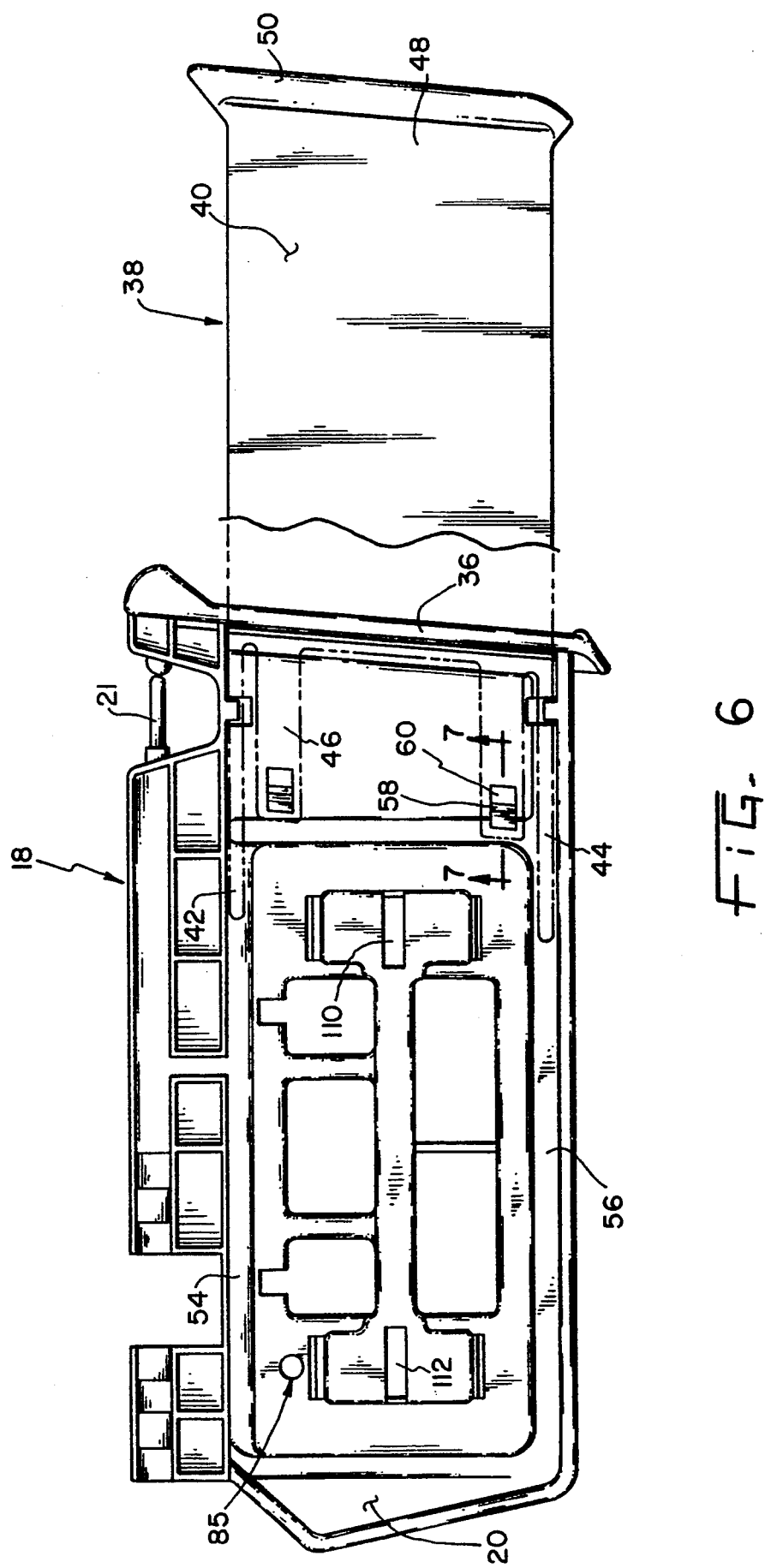

SUN VISOR WITH INTEGRAL CORE

BACKGROUND OF THE INVENTION

The present invention relates generally to sun visors for vehicles, and more particularly, to a sun visor having a molded plastic core member.

It is well known to provide a sun visor for the windshield of a vehicle, e.g., an automobile for shielding the eyes of the driver and front seat passenger from harsh direct or glaring light, primarily sunlight. Conventional sun visors have been constructed with a solid inner core board of a pressed wood material, and an outer cloth covering of foam-backed cloth that is sewn along a seam circumjacent the periphery of the core board. If it is desired to provide components such as a mirror, electrical circuitry for lighting the mirror, and an extender for increasing the coverage of the sun visor, it has been necessary to mount these components onto a side of the inner core board. The addition of these components tends to increase the thickness of the sun visor. In addition, a separate assembly operation is required to mount each component onto the core board, resulting in an accumulation of tolerances of the components as well as an accumulated variation introduced by each assembly operation.

In recent years, visor assemblies have been constructed with molded plastic core members. Typically, these are molded of a plastic material in two half sections or clam shells joined together by a hinge. The half sections form a cavity or recess within the core, into which the internal components such as the lighting circuitry including lamps and mirror are all located. The core halves are then pressed together and bonded by a heat sealing operation or the like.

In U.S. Pat. No. 5,054,839, issued to White, et al., a plastic core sun visor is disclosed in which the core members 12 and 14 are each covered with an upholstery material 16 and are then locked together by the engagement of rigid pins 44 extending inwardly adjacent the perimeter of one of the core members in snap-in engagement. A disadvantage with this design is that once the relatively expensive core mold has been built, there is no flexibility for changes in the overall size of the sun visor which are often required to accommodate varying sun visor size requirements in newly designed vehicles. Thus, if the size of an existing plastic core sun visor size is either too large or too small, a new mold must be made to change the size of the sun visor. It is desired to provide an improved sun visor that overcomes the above disadvantages.

SUMMARY OF THE INVENTION

The present invention provides a sun visor assembly having an integrally molded core member including molded access compartments for receiving various visor components therein. A cover member having a foundation base is folded over the core member and is attached to itself along a seam. The cover member may be selectively modified to a variety of desired shapes and sizes without requiring modification of the core member.

In particular, the invention provides, in one form thereof, a sun visor having a molded plastic core member wherein a first face of the core member includes an integrally molded extender assembly including channel members for slidingly receiving an extender blade therein, wherein the extender is slidable between a retracted position and an extended position. A second face of the core member includes a series of integrally molded channels and grooves which are formed in the mirror platform for the reception of a series of wires comprising the lighting circuitry. An upholstery covering member is folded over the core member and secured along a seam. The covering member includes a pair of access openings through which a mirror frame, mirror, door, lens, and spring assembly (mirror and door assembly) is attached to the core member. The mirror and door assembly is removable from the core member to permit access to the lighting circuitry for servicing.

An advantage of the sun visor assembly of the present invention is that the outer covering of the sun visor may be removed and replaced by a covering of a different size and shape to permit alteration of the geometry of the sun visor body without requiring a new inner core.

Another advantage of the sun visor assembly of the present invention is that the integral core design accommodates larger mirror and extender sizes.

Yet another advantage of the sun visor assembly of the present invention is that the sun visor has a less composite thickness than with prior designs which do not include the large radius structural beading around perimeter edges.

Still another advantage of the sun visor assembly of the present invention is that the lighted vanity mirror and wiring circuitry are serviceable.

A still further advantage of the sun visor of the present invention is that the integral core member eliminates the labor and parts necessary to attach the same components to a traditional core board.

The present invention, in one form thereof, comprises a sun visor assembly having a molded plastic core member and a outer covering material covering the core member. The covering material is substantially adhered to a foundation. The covering material is folded over the core member and fastened to itself in such a manner to secure the core member substantially within the covering material.

The invention further provides, in one form thereof, a method of assembly a vehicular sun visor wherein a molded plastic core member is provided and includes a groove molded in a first face. A conducting wire including a lamp is secured in the groove. The core member and the conducting wire are covered with a covering material having an access opening therein such that the access opening is aligned over the lamp. A mirror assembly is then removably mounted on the core member through the access opening. In addition, a door assembly is removably mounted to the mirror assembly.

BRIEF DESCRIPTION OF THE DRAWINGS

FIG. 3 is an enlarged fragmentary sectional view of the sun visor assembly of FIG. 2, taken along line 3—3 in FIG. 2;

FIG. 4 is an enlarged sectional view of the sun visor assembly of FIG. 2, taken along line 4—4 in FIG. 2;

FIG. 6 is an enlarged rear elevational view of the integral core member shown in FIG. 1, and additionally showing an extender blade attached thereto.

DESCRIPTION OF THE PREFERRED EMBODIMENT

Figure 1:
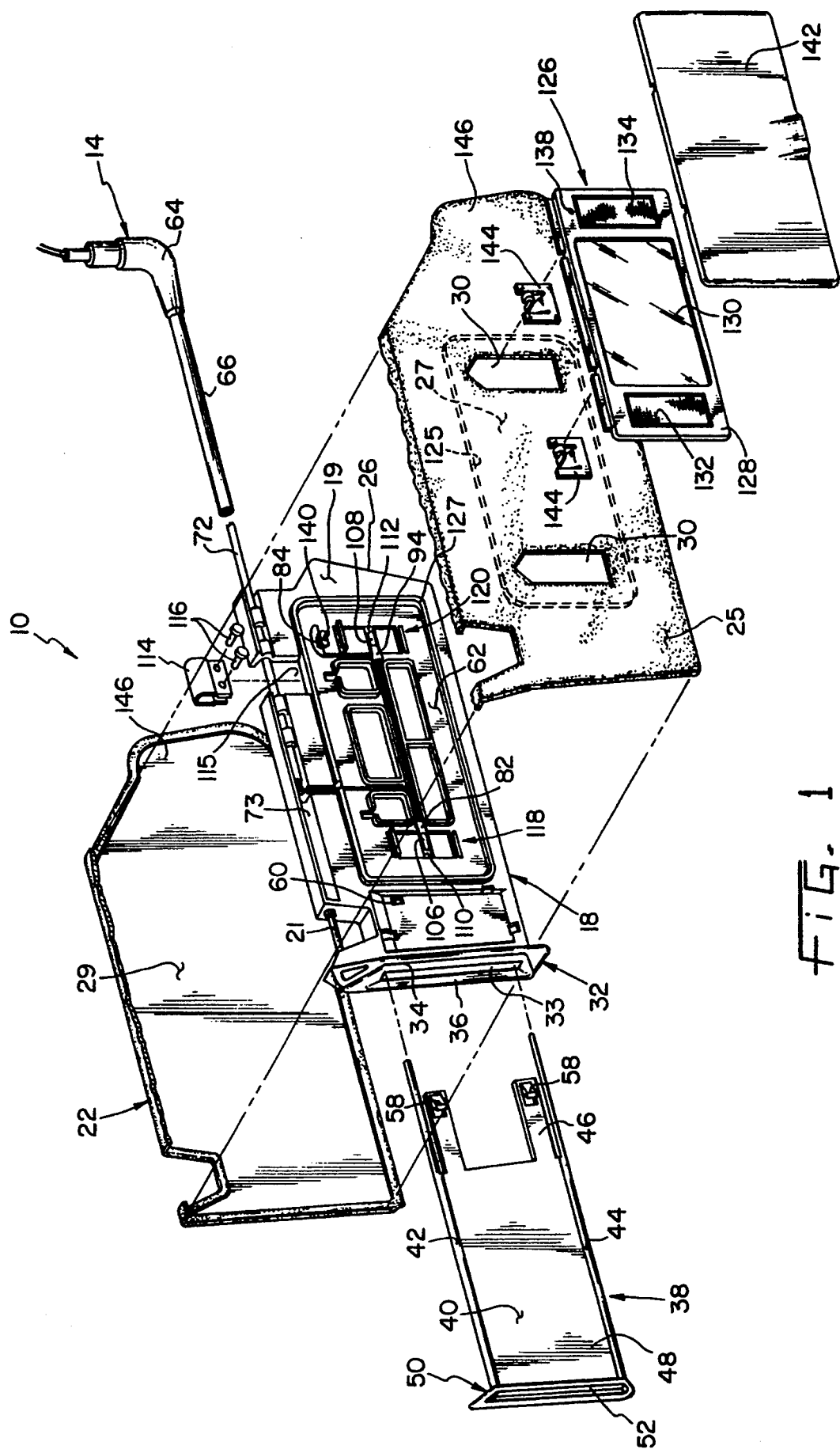
FIG. 1 is an exploded perspective view of a sun visor assembly in accordance with the present invention.
Figure 2:
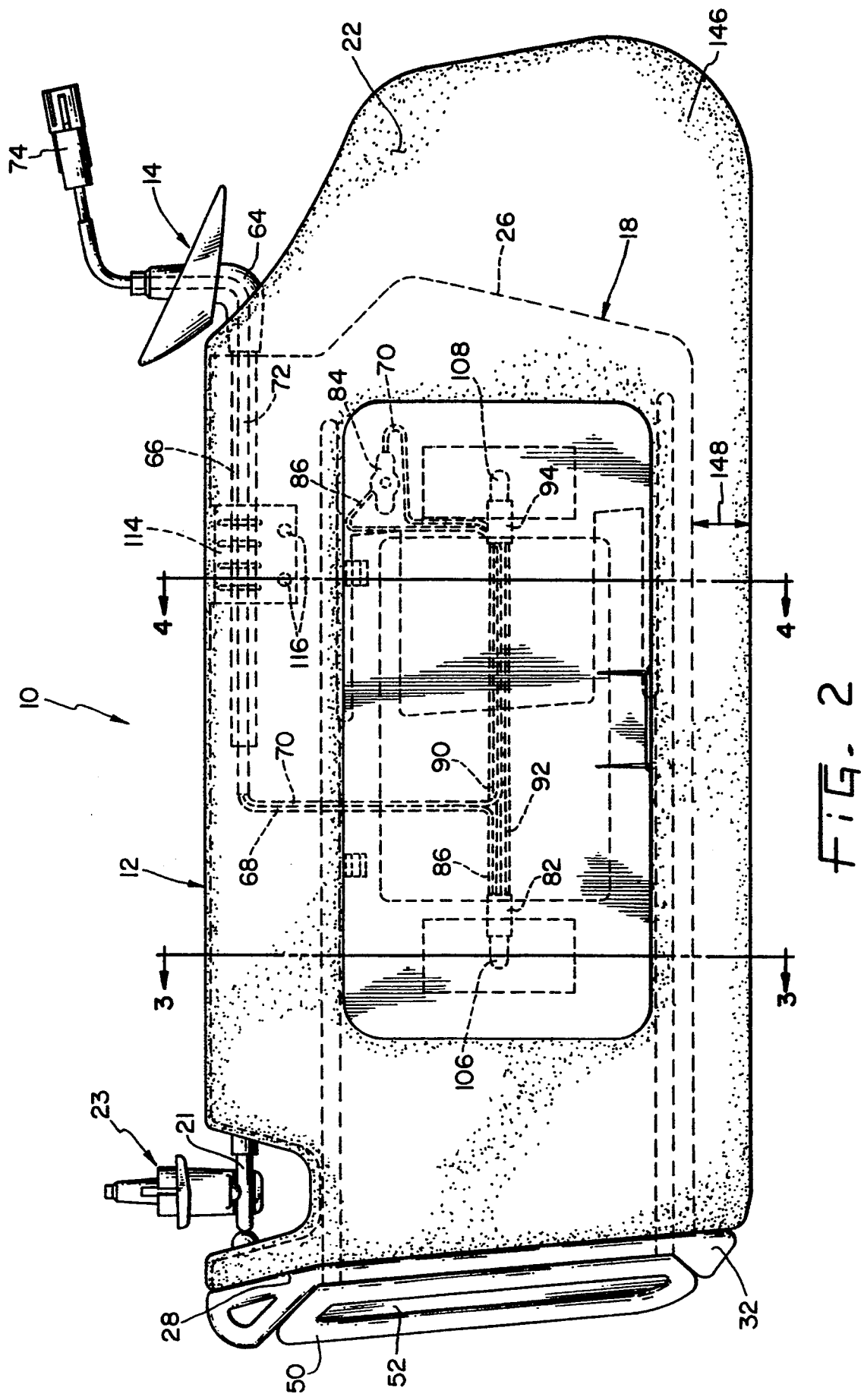
FIG. 2 is an enlarged, assembled front elevational view of the sun visor assembly shown in FIG. 1.

Referring now to the drawings, and in particular to FIGS. 1 and 2, there is shown a sun visor assembly 10 generally comprising a sun visor body 12 that is operably connected to a vehicle headliner (not shown) by means of a mounting bracket and arm assembly 14. Assembly 14 serves as a horizontal axis for rotation of the sun visor between a storage position and a first use position adjacent the front windshield.

Sun visor body 12 comprises a solid integral core 18 having a front face 19, a rear face 20 (FIG. 6), and an integral supplemental pin member 21 that is removably snap fit into a retainer 23. Upon disengagement of pin member 21 from retainer 23, assembly 14 also serves as a vertical axis for movement of the sun visor body to a second use position adjacent the side window. It is noted that for sun visors not requiring pin member 21, the front geometry may be adjusted by reorienting rod 66 relative to core 18 and adjusting the flex flap as required.

Body 12 further includes a single piece outer covering assembly 22 made of cloth 25 having a bonded foam backing 27, wherein cloth 25 is edge adhered to a kraft paper foundation 29. Covering 22 is folded over core 18 and is adhered (e.g. sewn or glued) substantially along its perimeter to form a double layered peripheral edge portion 24 (FIGS. 3,4) about periphery 26 of core 18. On one side of sun visor body 12, covering 22 is provided with an access opening 28 for receiving extender frame portion 32. Covering 22 is further provided with openings 30 for exposing a pair of lamps which shall be further described herein.

Core 18 comprises a single molded plastic piece, preferably made of ABS. Extender frame portion 32 of core 18 includes an opening 33 defined by end portions 34 and 36 for receiving an extender blade 38 therethrough. Extender blade 38 is a generally rectangular-shaped, molded plastic piece including a flat body portion 40 having a top edge 42, a bottom edge 44, a captured end 46, and a free end 48. Top edge 42 and bottom edge 44 are preferably in the form of beads to fit within the appropriate tracks in core 18. Extender blade 38 is further provided with a handle portion 50 having a decorative channel 52 therein. Handle 50 is raised from body portion 40 to facilitate grasping of the handle.

Figure 7:
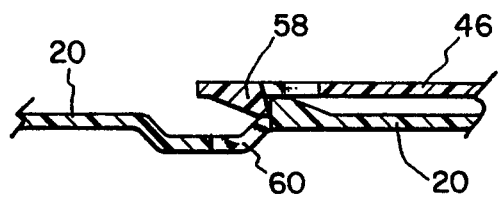
FIG. 7 is an enlarged, fragmentary sectional view of the core member and extender blade taken along line 7—7 in FIG. 6.

Core 18 is provided with an integral channel in rear face 20 to provide top 54 and bottom 56 tracks between which extender blade 38 is slidingly retained. Captured end 46 of extender blade 38 includes a pair of protrusions 58 which ride freely within corresponding tracks 54, 56. When blade 38 is fully extended, protrusions 58 catch on slots 60 (FIG. 7), thereby preventing blade 38 from becoming disengaged from tracks 54 and 56.

Figure 5:
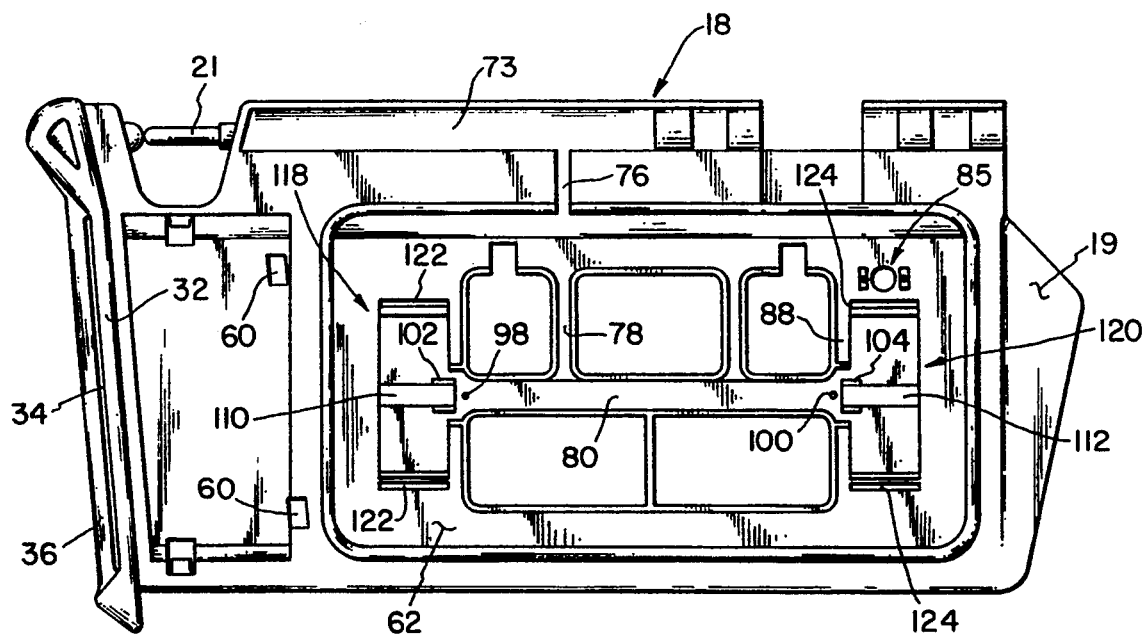
FIG. 5 is an enlarged front elevational view of the integral core member shown in FIG. 1.

Referring now primarily to FIGS. 1, 2, and 5, front face 19 of core 18 includes a generally rectangular recessed portion 62 for receiving the lighting circuitry for the mirror and door assembly. As shown, mounting bracket and arm assembly 14 includes a generally L-shaped elbow 64 that is molded about a rod 66, which is tubular and receives a pair of power conductor wires 68 and 70 which are housed in wire harness 72 that is secured within a portion of top channel or groove 73 within core 18. Referring to FIG. 2, one end of each wire 68, 70 is connected to connector 74, which is connected to a source of electrical power in the vehicle. The other end of each wire 68, 70 is channeled through access groove 76 and then through groove 78 in recessed portion 62 and into main circuitry groove 80. In groove 80, wire 68 is connected to lamp housing 82, and wire 70 is connected to switch assembly 84, which is mounted in switch housing area 85 in recessed portion 62. Another wire 86 extends through channels 88 and 80 and to lamp housing 82. In addition, wires 90 and 92 are located within groove 80 to communicate between lamp housing 82 and lamp housing 94.

As described above, a feature of the present invention is that the lighting circuitry may be attached directly to core 18 through a unique set of grooves, thereby eliminating the need for a separate stamped circuit to be attached to the core. Referring again to FIG. 5, lamp housings 82 and 94 each include a respective opening (not shown) which receives a respective upstanding alignment post 98, 100. In addition, integral clip members 102, 104 are provided for securing respective lamp housings 82 and 94 and corresponding lamps 106, 108 into respective lamp openings 110, 112 in recessed portion 62.

As shown in FIGS. 1 and 2, a generally U-shaped detent clamp 114 is positioned about recessed portion 115 on core 18 and surrounds a portion of rod 66. Clamp 114 is retained on core 18 by rivets 116. Rod 66 has flats that cooperate with detent clamp 114 to hold/lift the visor in the park position.

In the assembly of sun visor 10, once bracket and arm assembly 24, the lighting circuitry, and detent clip 114 have been properly installed on core 18, covering 22 is attached to core 18 such that access openings 30 expose lighting frame portions 118 and 120 including attachment hooks 122 and 124. Cover 22 is then adhered to itself as described earlier. As best shown in FIG. 3, edge 125 becomes nested or trapped in place by lip 127 on core 18 when the perimeter of cover 22 is adhered together. This prevents the cover from sliding off the core. A mirror door and frame assembly 126 includes a frame 128 have a large central rectangular opening for receiving and exposing a mirror 130. Frame 128 is preferably molded from the same material as core 18. Frame 128 further includes two smaller end openings for receiving lenses 132 and 134 for placement over lamps 106 and 108, respectively. As best shown in FIG. 3, frame 128 further includes hooks 136 that engage hooks 122 and 124 in snap-on arrangement to removably secure frame 128 to core 18 through access openings 30 in cover 22. As frame 128 is snapped into place, opening 138 receives upstanding switch actuator 140.

As shown in FIG. 1, a rectangular portion of paper foundation 29 is missing from a portion of cover 22. As frame 128 is snapped into place, the urethane foam 27 of cover 22 is pressed into the various grooves in recessed portion 62 which essentially reduces wire vibration in the grooves.

After attaching mirror frame and door assembly 126 to core 18, a hinged cover or door 142 is removably connected to frame 128 by door springs 144, as shown in FIGS. 1 and 4. When door 142 is in its closed position, actuator pin 140 is depressed by the door thereby opening the electrical circuit. When door 142 is swung to its open position to expose mirror 130, pin 140 moves upwardly thereby closing the electrical circuit to energize lamps 106 and 108. It is noted that all wire channels as well as the extender channel become closed when the assembly operations are completed.

A feature of the present invention is that sun visor body 12 is easily serviceable. Frame 128 may be snapped off of core 18, thereby exposing lamps 106 and 108 as well as the wire circuitry through access openings 30 in cover 22. For example, if one of the wires in the circuitry is bad, the entire wiring harness can be replaced without destroying the visor. In addition, door 142 may be removed from frame 128 by removing hinge springs 144, which are preferably of a push/pull design. Springs 144 each includes a flat portion 145 that nests in a depression on the back of frame 128. Spring 144 is flexed in the direction of arrow 147, and door hinge pin 149 is then placed under the center of hook portion 151 of spring 144. The spring is then released which locks the parts together. Also, the mirror components, lamp housings, or lamps themselves may be serviced without requiring replacement of the visor. In addition, the extender may be disengaged from core 18 and replaced.

Another feature of the present invention is that cover 22 is folded over core 18 and is bonded along the perimeter. An advantage of this arrangement is that flex flap portion 146 of cover 22 is not part of plastic core 18. In addition, as best shown in FIG. 2, there is a relatively large spacing 148 between peripheral edge 26 of core 18 and the peripheral edge of cover 22. Both spacing 148 and the dimensions of flex flap 146 may be varied to change the size and dimensions of sun visor body 12 without requiring core 18 to be modified.

Another feature of the present invention is that cover 22 is removable from core 18 so that a visor of another shape and size can be mounted over the core. In addition, if desired, mounting bracket and arm assembly 14, including rod 66 may be removed from visor body 12, whereupon foundation 29 may be flexed sufficiently to permit edge 125 to extend over lip 127, thereby permitting cover 22 to be slidably removed from the core without damaging cover 22.

It will be appreciated that the foregoing is presented by way of illustration only, and not by way of any limitation, and that various alternatives and modifications may be made to the illustrated embodiment without departing from the spirit and scope of the invention.

What is claimed is:

1. A sun visor assembly comprising:
   a molded plastic core member; and
   an outer covering material covering said core member, said covering material being substantially adhered to a rigid foundation, wherein a first face of said core member includes a series of interconnected grooves integral with said core member and being molded therein and an electrical conductor disposed in said series of grooves;
   said covering material being folded over said core member and fastened to itself in such a manner to secure said core member substantially within said covering material, said covering material extending beyond a substantial portion of said substantially define the shape of the sun visor.

2. The sun visor of claim 1, wherein an opposite second face of said core member includes integral channel means molded therein for slidingly receiving an extender blade therein.

3. The sun visor of claim 1, wherein a separate mirror assembly is removably attached to said first face over said integral groove.

4. The sun visor of claim 3, wherein a door member is removably mounted on said mirror assembly.

5. A vehicular sun visor assembly, comprising:
   a molded plastic core member having a first face and an opposite second face;
   a series of interconnected grooves integral with said core member and being molded in said first face;
   a conducting wire disposed in said series of grooves, said wire including a lamp at an end thereof;
   a channel portion integrally molded in said second face;
   a blade member slidingly received within said channel portion, said blade member including a captured end received within said channel portion and an opposite free end being out of engagement with said channel portion;
   an outer covering material covering said core member, said covering material being substantially adhered to a rigid foundation;
   said covering material being folded over said core member and fastened to itself in such a manner to secure said core member within said covering material, said covering material extending beyond a substantial portion of said core member to substantially define the shape of the sun visor.

6. A method of assembling a vehicular sun visor comprising the steps of:
   providing a molded plastic core member having a first face, wherein a plurality of interconnected grooves integral with said core member is molded into said first face;
   threading a conducting wire including a lamp at an end thereof into said plurality of grooves;
   covering said core member and said conducting wire with a rigid covering material having an access opening therein such that said access opening is aligned over said lamp;
   mounting a removable mirror assembly on said core member through said access opening; and
   mounting a removable door assembly to said mirror assembly.

7. The method of assembling a sun visor of claim 6, including:
   providing an integral channel member in a second face of said core member; and
   mounting an extender blade in said channel member such that said extender blade is slidingly received within said channel member;
   wherein the step of mounting said extender blade in said channel occurs before the step of covering said core member with said covering material.

8. The method of claim 6, comprising:
   removing the door assembly from the mirror assembly;
   removing the mirror assembly from the core member;
   removing the rigid covering material from the core member;
   covering the core member with a second covering material;
   mounting the removable mirror assembly on the core member through the access opening; and
   mounting the removable door assembly to the mirror assembly.

9. A sun visor assembly comprising:
   a plastic core member having a peripheral edge; and
   an outer covering material covering said core member, said covering material comprising a cloth material adhered to a rigid foundation, said covering material being folded over said core member and fastened to itself in such a manner to secure said core member substantially within said covering material, said covering material extending beyond the peripheral edge of said core member to define the shape of the sun visor.

10. The sun visor of claim 9, wherein a first face of said core member includes an integral channel molded therein for slidingly receiving an extender blade therein.

11. The sun visor of claim 9, wherein a separate mirror assembly is removably attached to said first face.

12. The sun visor of claim 9, wherein a door member is removably mounted onto said mirror assembly.

13. A vehicular sun visor assembly, comprising:
a plastic core member having a first face, an opposite second face and a peripheral edge;
a channel portion integrally molded in said first face;
a blade member slidingly received within said channel portion, said blade member including a captured end received within said channel portion and an opposite free end being out of engagement with said channel portion; and
an outer covering material covering said core member, said covering material comprising a cloth material adhered to a rigid foundation, said covering material being folded over said core member and fastened to itself in such a manner to secure said core member substantially within said covering material, said covering material extending beyond the peripheral edge of said core member to define the shape of the sun visor.

* * * * *